J. JOHNSON, L. W. INGRAM, & J. HARPER.
Seed-Planters.
No. 151,030. Patented May 19, 1874.
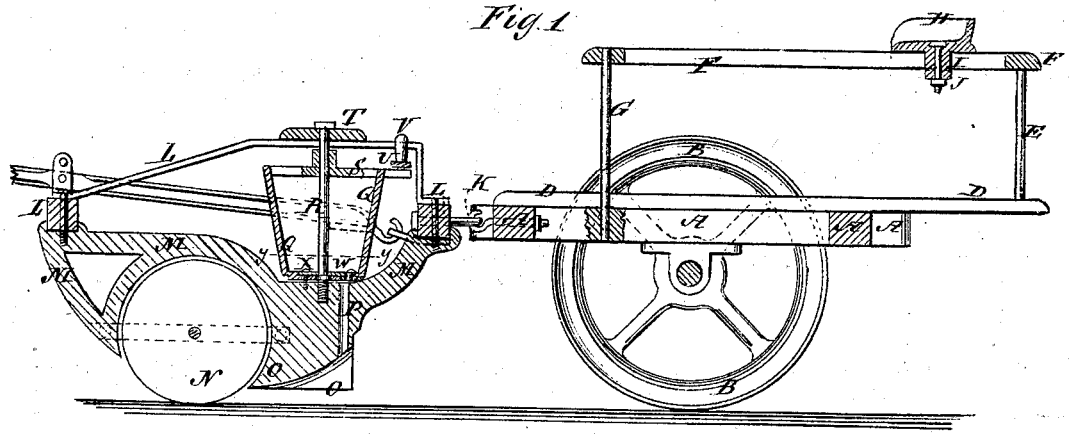
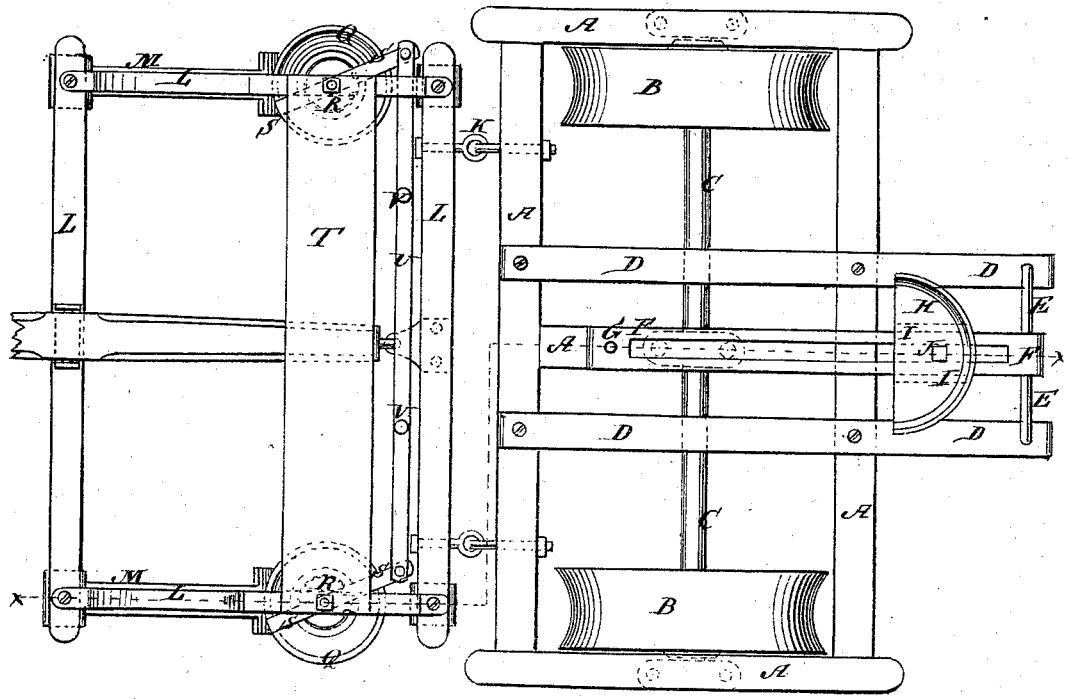
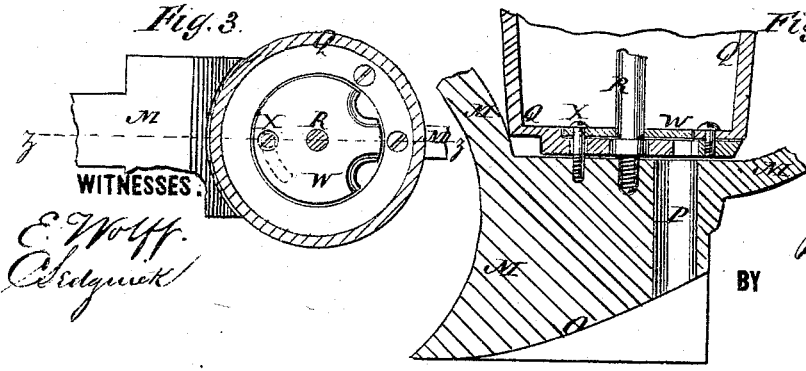
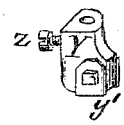

UNITED STATES PATENT OFFICE

JOHN JOHNSON, OF PERRY, AND LUTHER W. INGRAM AND JOHN HARPER, OF NAPLES, ILLINOIS.

IMPROVEMENT IN SEED-PLANTERS.

Specification forming part of Letters Patent No. 151,030, dated May 19, 1874; application filed March 21, 1874.

*To all whom it may concern:*

Be it known that we, JOHN JOHNSON, of Perry, in the county of Pike and State of Illinois, and LUTHER W. INGRAM and JOHN HARPER, of Naples, in the county of Scott and State of Illinois, have invented a new and useful Improvement in Seed-Planter, of which the following is a specification:

Figure 1 is a detail vertical section of our improved seed-planter, taken through the line *x x*, Fig. 2. Fig. 2 is a top view of the same. Fig. 3 is a detail horizontal section of the seed-hopper, taken through the line *y y*, Fig. 1. Fig. 4 is a detail vertical section of the lower part of the hopper and the rear part of the runner, taken through the line *z z*, Fig. 3. Fig. 5 is a modified form of the cut-off.

Similar letters of reference indicate corresponding parts.

Our invention has for its object to improve the construction of the seed-planter for which Letters Patent No. 28,490 were issued to John Johnson May 29, 1860, so as to make it more convenient in use and more effective in operation. The invention consists in the vibrating hoppers, provided with dropping-holes in their bottoms, the stationary cut-off plates, the pivoting-rods, the arms, and the connecting-bar, provided with one or more handles, in combination with the runners, the plows, and the forward part of the frame-work; in the runners, the rotating cutters, and the plows, in combination with the vibrating hoppers and the frame-work; and in the combination of the runners, the rotating cutters, the plows, and the concave-rimmed wheels with each other and with the hinged frame and the hoppers, as hereinafter fully described.

A is the rear part of the frame, which consists of two cross-bars and three longitudinal bars. B are the wheels, the rims of which are made wide and are concaved, as shown in Figs. 1 and 2, so as to press the soil down upon the seed, and leave it in the form of a low ridge over the seed. Each of the wheels B is attached to its own shaft C, so that they may revolve independently of each other. The two shafts C are placed in line with each other. Their outer ends revolve in bearings in the side bars of the frame A, and their inner ends revolve in the same bearing attached to the center bar of said frame A. To the frame A, upon the opposite sides of the center bar, are attached two bars, D, the rear ends of which project in the rear of the frame A, and to said projecting rear ends are attached the lower ends of two standards, E, the upper ends of which are attached to the rear end of the bar F, the forward end of which is supported by a standard, G, attached to the center bar of the frame A. The bar G supports the driver's seat H, and has a longitudinal slot formed in it to receive the T slide-block I and the bolt J, by which said seat H is secured to said slotted bar F. By this construction the driver can slide his seat back, so that his weight may raise the forward part of the machine from the ground, for convenience in turning around. To the front cross-bar of the rear frame A is hinged, by eye or hook bolts K, or other convenient connections, the rear cross-bar of the front frame L. The frame L consists of two cross-bars, connected near their ends by two longitudinal bars or braces. M are the runners, the ends of which are bolted to the ends of the cross-bars of the frame L. The lower forward part of the runners M are recessed to receive the rotary cutters N, which cut through or run over roots, sods, and other obstructions, and thus prevent the seed-dropping device from catching upon them and being broken. Upon the lower rear parts of the runners M are formed, or to them are attached, double-share plows O, by which the furrow is opened to receive the seed, which is introduced through a vertical hole, P, in the rear parts of said runners. The seed then falls upon the wide flat part of the furrow before any soil can fall in, so that the said seed may scatter, and not lie in a clump or cluster. The upper rear parts of the runners M are recessed to receive the hoppers Q, which are pivoted in place by the rod R, the lower end of which passes through a hole in the center of the bottom of said hoppers, and is screwed into the runner M a little in front of the dropping-hole P. The upper end of the rod R passes up through the bar S, attached to the top of the hoppers Q, through the bars or braces of the frame L, through the ends of the dropper's seat T, and has a nut screwed upon it. The rear ends of the bars S project, and to them are pivoted the ends of the cross-bar U, which has one or more handles, V, attached to it, so that a boy, sitting upon the seat T, can readily vibrate the hoppers Q to drop the seed. The bottom of the hoppers has two holes formed through it, of such a size as to contain enough seed for a hill, and is recessed to receive a small circular plate, W, which is secured in place and held stationary by a screw, X, which passes through a curved slot in the bottom of the hopper Q and screws into the runner M. The screws X serve also as stops to limit the movement of the hoppers Q. The plates W have two notches cut in their edges, at a little distance from each other, to allow the seed to pass through to the holes in the hopper-bottoms. The part of the plates W between the notches is placed directly over the upper end of the hole P, through which the seed passes to the ground, so as to serve as a cut-off, to prevent any more seed being dropped at a time than enough to fill one of the holes in the bottom of the hoppers Q. The sides of the furrow are pressed in at the rear of the plows O by the concaved rims of the wheels B, which press the soil down upon the seed and form a low ridge along the row.

The seed-holes in the bottoms of the hoppers Q may be made adjustable in size by having small adjustable pieces secured in them.

The cut-off plate W may be replaced, if desired, by the equivalent sleeve cut-off Y, which is placed upon the lower part of the rod R, with the projection formed upon the side of its lower end directly over the upper end of the hole P, where it is secured in place upon said rod R by a set-screw, Z. To the lower part of the sides of the projection of the sleeve Y are secured pieces of leather or rubber $y'$, to prevent any more seed passing out at a time than enough to fill the holes in the bottom of the hopper Q.

Having thus described our invention, we claim as new and desire to secure by Letters Patent—

1. The vibrating hoppers Q, provided with dropping-holes in their bottoms, the stationary cut-off plates W, the pivoting-rods R, the arms S, and the connecting-bar U, provided with one or more handles, in combination with the runners and plows O, substantially as herein shown and described.

2. The runners M, rotating cutters N, and plows O, in combination with the vibrating hoppers Q and frame-work L, substantially as herein shown and described.

JOHN JOHNSON.
LUTHER W. INGRAM.
JOHN HARPER.

Witnesses:
HENRY H. McNEAL,
CHAS. W. HATFIELD.